(12) United States Patent
Hinderling et al.

(10) Patent No.: US 8,422,035 B2
(45) Date of Patent: *Apr. 16, 2013

(54) DISTANCE-MEASURING METHOD FOR A DEVICE PROJECTING A REFERENCE LINE, AND SUCH A DEVICE

(75) Inventors: Juerg Hinderling, Marbach (CH); Anton Kehl, Ruethi (CH); Wolfgang Rebhandl, Dornbirn (AT); Roland Graf, Untereggen (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,050

(22) Filed: Aug. 9, 2012

(65) Prior Publication Data

US 2012/0300191 A1   Nov. 29, 2012

Related U.S. Application Data

(63) Continuation of application No. 12/738,614, filed as application No. PCT/EP2008/009010 on Oct. 24, 2008, now Pat. No. 8,269,984.

(30) Foreign Application Priority Data

Oct. 26, 2007   (EP) .................................... 07119366

(51) Int. Cl.
*G01B 11/14*  (2006.01)
*G01C 3/08*  (2006.01)

(52) U.S. Cl.
USPC ........... 356/614; 356/4.01; 356/5.01; 356/5.1

(58) Field of Classification Search .......... 356/614–623, 356/3.09, 4.03, 4.08, 5.1, 5.01, 4.01, 5.09
See application file for complete search history.

(56) References Cited

U.S. PATENT DOCUMENTS

| | | | |
|---|---|---|---|
| 3,894,230 A | 7/1975 | Rorden et al. | |
| 5,629,756 A | 5/1997 | Kitajima | |
| 6,463,393 B1 | 10/2002 | Giger | |

(Continued)

FOREIGN PATENT DOCUMENTS

| | | |
|---|---|---|
| EP | 1 001 251 A1 | 5/2000 |
| EP | 2 026 479 A1 | 2/2009 |
| WO | 2008/009387 A1 | 1/2008 |
| WO | 2008/017486 A1 | 2/2008 |

OTHER PUBLICATIONS

International Search Report dated Feb. 20, 2009 as received in application No. PCT/EP2008/009010.

*Primary Examiner* — Hoa Pham
(74) *Attorney, Agent, or Firm* — Maschoff Brennan

(57) ABSTRACT

A device projecting a reference line, wherein at least one part of the reference path may be detected upon passing through by the human eye and/or detectors as a reference line. In conjunction with passing through the reference path, a distance measurement occurs to at least one point on the reference path by transmitting a measurement beam that is parallel or coaxial to the reference beam or using the reference beam as a measurement beam. After receipt of portions of the reflected measurement beam, a signal is derived from said portions and a distance from at least one point is determined from the signal, wherein the guidance along the reference path is repeated at least once more and, upon each instance of passing through the reference path, a distance or distance-related variable is determined for each point.

36 Claims, 7 Drawing Sheets

U.S. PATENT DOCUMENTS

| | | |
|---|---|---|
| 6,483,106 B1 | 11/2002 | Ohtomo et al. |
| 7,787,134 B2 * | 8/2010 | Kohnen et al. ............... 356/620 |
| 8,060,344 B2 * | 11/2011 | Stathis ............................ 703/1 |
| 8,174,682 B2 * | 5/2012 | Suzuki et al. ................ 356/5.01 |
| 8,269,984 B2 * | 9/2012 | Hinderling et al. ........... 356/614 |
| 2006/0044570 A1 | 3/2006 | Konetschny |
| 2007/0044331 A1 | 3/2007 | Yung et al. |
| 2010/0271616 A1 | 10/2010 | Suzuki et al. |
| 2010/0275454 A1 | 11/2010 | Tippett et al. |

* cited by examiner

DISTANCE-MEASURING METHOD FOR A DEVICE PROJECTING A REFERENCE LINE, AND SUCH A DEVICE

RELATED APPLICATIONS

This application is a continuation of U.S. patent application Ser. No. 12/738,614, having a §371(c) date of Apr. 21, 2010, which claims priority via PCT/EP2008/009010 filed Oct. 24, 2008 to European Patent Application No. 07119366.8, filed on Oct. 26, 2007, all of which are incorporated by reference herein in their entirety.

FIELD OF THE INVENTION

The invention relates to a distance-measuring method for a device projecting a reference line, having an electro-optical rangefinder and a device projecting a reference line and a surveying system.

BACKGROUND

In many applications, visible or invisible reference lines are projected which serve, either for the human eye or for electronic systems, as a reference which also permits automatic positioning or machine guidance. Here, the reference lines are generally produced by divergence of a laser beam, which is possible in particular for straight lines, or by projection of a laser spot which is moved along a trajectory, which in principle permits any desired paths and hence reference lines.

Rotary lasers, which serve for establishing a plane with a visible or invisible laser beam and have been in use for many years, for example in the construction sector or in industry, are an example of this. They are a valuable aid for marking construction lines along horizontal, vertical or defined skew planes. However, rotary lasers to date have the disadvantage of defining only one dimension, such as height or skewness, which reduces the efficiency for the user.

Other systems are, for example, laser levels having a nadir or zenith beam, which are suitable for defining plumb lines for walls, riser pipes, cable ducts, air-conditioning shafts, horizontal windowsills, installation panels, pipes and cables. These reference lines may be detectable to the eye or to an optical detector, in general a mark visible to the eye being produced.

A laser level projects only a line on the irradiated object, as a rule in conjunction with a defined height to be specified visibly to the user. The information used here was therefore likewise only one dimensional. Often, however, it is also intended to determine or visualize even further information, for example there is for certain tasks the need to measure, to check or to obtain in visible form not only the height but also the distance (x) of the lateral position (x, y) from a point, for example in the case of renovation of a flat roof, where the sags must be known not only in height but also in lateral position. Moreover, no information about the surface onto which a projection takes place is available to systems to date for projecting reference lines. Without a knowledge of shape and position of the surface relative to the system, a projection can lead to distortion of the projected reference lines.

Furthermore, a lack of knowledge of the surface makes marking adapted to said surface completely impossible. If, for example, holes are to be drilled at a defined distance to the left and right of a door opening, it has been necessary to date to carry out a separate measurement manually, by means of which the lateral distance is determined. A projected reference line serves only for specifying the height of these drilled holes. In particular, systems of the prior art cannot automatically identify such a structure.

Systems generally known from the prior art for determining dimensions are laser scanners which scan and survey the surfaces point-by-point along a measuring path. However, they do not provide any functionalities which can specify a reference line or project a visible mark which in turn would permit an interaction with the user. There is therefore no linkage of surface determination and output of detectable or perceptible information or markings. Moreover, owing to their intended use, scanners have only a precision of the measurements relative to one another, and high-precision specification of a direction (orientation) relative to an external or global coordinate system is accordingly neither required nor realized by the apparatus, so that vertical plumbing with such apparatuses is too inaccurate. Moreover, precise vertical measurement which meets the requirements or specifications in the building sector is not possible.

A combination of distance-measuring and projection functionality is disclosed in US 2007/0044331 A1, in which a laser level with an ultrasonic distance-measuring unit is disclosed. The static leveller produces two laser fans arranged orthogonally in a cross. The US rangefinder is positioned next to the common axis of these two fans and measures in this direction the polar distance to the target object, the laser apparatuses themselves being suspended from a pendulum. The two laser fans are thus oriented relative to the perpendicular. The rangefinder on the other hand is fastened to the housing and points exactly in the direction of the line of intersection of the two laser fans only in the case of levelling of the instrument. In other dispositions, the surveyed target point is not known accurately. The manner of the distance measurement is therefore not linked to the levelling function, the two functions also not being integrated by the device. In the case of distance measurements, the device is used as an independent, hand-held distance tool. Thus, for example in the case of volume measurement, the user must reposition the device three times and carry out corresponding distance measurements in each case in three independent dispositions oriented as far as possible at right angles to one another. A levelling function or a direction measurement is not utilized.

Ultrasonic rangefinders moreover have accuracies in the cm range and are therefore too inaccurate for most construction requirements. Particularly disadvantageous is the sound wave which is caused to diverge by diffraction and assumes a dimension of several cm at the target object. Edges of girders or door frames cannot be surveyed therewith.

US 2006/0044570 A1 discloses a laser-based position determination device. It comprises at least one laser emitter having a rotation in a horizontal plane with a synchronization signal relative to a reference angle based on this axis. If the transmitted beam strikes a detector, which is positioned in each case at the target point to be surveyed, it acts as a position-sensitive photosensor by means of which the pulse length as a function of time and the phase angle can be determined. From phase position and pulse length, angular position and radial distance to the detector can then be determined. The apparatus can be used for 2D and for 3D measuring tasks. The time measurement at the target object is achieved by modulating the laser beam. The accuracy of the distance measurement on the other hand is determined mainly by the uniformity of the rotational speed. In the case of a deviation of the actually travelled angle of, for example, 100 $\mu$rad from the setpoint value over an angle of rotation of 45 degrees, a relative distance error of only $400\,\mu\text{rad}/\pi = 127$ ppm is produced. In the case of distances of up to 50 m to be measured, errors of 6.4 mm therefore occur, which is too inaccurate, for example, for tasks in the construction sector.

A system comprising a cycling distance measurement for a mobile working machine is described in the International PCT application with the application number NO. PCT/EP2007/007058. There, a position determination apparatus has a transmitter for the emission of optical emitted beams, a receiver and a deflection means rotatable about a vertical axis for guiding the transmitted beams in horizontal directions. The deflection means define a plane which is substantially horizontal and in which the received beams are also detected by the receiver. After their emission and subsequent reflection by the reference objects, the transmitted beams are detected again by means of a receiver of the positioning system, the distances to the reference objects being determined from the received signals of the receiver, in particular according to the phase measurement principle or the principle of pulse transit time measurement. The directing of the transmitted beams towards the reference objects and of the reflected beams as received beams towards the receiver are effected by the deflection means. However, the measurement in this plane is effected from the movement and to a few, typically four, cooperative targets, i.e. reflectors, which are placed at known positions. By means of these measurements, the position of the measuring unit relative to these cooperative targets is determined so that, from a knowledge of the position thereof, it is possible to derive that of the moving unit. The rangefinder described there is neither intended nor suitable for determining points on noncooperative surfaces. Since it operates according to the conventional phase measurement principle, it is too slow for the angular speeds required in the projection of a reference line. At the high speeds required for this purpose, the laser would experience a blurring of the measurement during a measurement to the target object. In addition, the device requires a large amount of space since, in the case of the biaxial arrangement of transmitter and receiver described, the latter rotates around the transmitter. Finally, there is no projection of marks which can be detected by the eye or detectors and permit guidance of the user or referencing by a further surveying unit.

EP 1 001 251 discloses a laser scanner having a distance-measuring and target-tracking function, which comprises a device for producing a visible laser beam and a transmission optical system having controllable deflection means rotatable about two nonparallel axes. The deflection means are actuated with point resolution by means of servo motors and angle encoders according to a specified arbitrary pattern. As a result, firstly a projection of arbitrary point, line or area patterns onto, for example, a room wall and secondly exact surveying of the room and beam tracking relative to moving objects are permitted. However, there is no automated and continuous measurement of points in the path of the projected pattern. Moreover, the scanning measurement of points means that a complete determination of the distance with the desired or required accuracy must take place in each of these measurements during only a single pass through the scanning path. If the environmental conditions are too poor, aids must be used or a measurement cannot take place. The measurement to weakly back-scattering surfaces or to objects which are temporarily concealed is therefore not possible. However, the latter point is of importance particularly in the construction sector when, for example, a device projecting a reference line is operated in a room and the user continuously interrupts the moving beam with his body, so that a single survey gives only incomplete results.

U.S. Pat. No. 5,629,756 describes a rotary laser by means of which, with the use of a special reflector element on the wall, the distance to the wall can be measured. This distance is used in order to focus the laser line onto the wall so that a clearly recognizable, sharp line is produced on the wall. In addition, it is proposed to use the measured distance for adaptation of the rotational speed since—in the case of a distance to the wall of, for example, more than 30 m—the projected laser line is thus better detectable at lower rotational speeds. Moreover, this solution is not capable of measurement to natural surfaces, i.e. even without use of a reflector, under all conditions prevailing in normal operation.

SUMMARY

It is therefore the object of the invention to provide an improved distance-measuring device projecting a reference line and a corresponding method.

A further object is to increase the accuracy of measurement and/or extend the area of use of the distance-measuring functionality of such a method or device.

A further object is to provide such a method or device which automatically determines continuous information about the surface onto which the projecting takes place, in particular in order to adapt the projection appropriately or to monitor the progress of processing.

These objects are achieved by realizing the characterizing features of the independent or dependent claims.

In a distance-measuring method according to the invention or such a device, functionalities projecting a reference line and measuring a distance are integrated by utilizing the emission used for projection or at least its beam path also for a distance measurement. Here, a defined measuring path is passed through or travelled through by means of an optical measuring beam which is emitted by an electronic rangefinder, i.e. the measuring beam is guided in such a way that the trajectory of its projection corresponds to this defined measuring path and the reference line to be projected. A distance is determined at at least one point of the measuring path, in particular at a multiplicity of points of the measuring path, according to the invention the measuring path being travelled through or passed through by the projection of the measuring beam with at least one repetition, in particular a multiplicity of repetitions, within a measuring process, i.e. for the determination of the distance. In contrast to systems having a scanning movement, the same path is thus passed through several times and hence the profile points are scanned several times in the case of angle-synchronous distance measurements, which permits both an improvement of the measurements by accumulation or mean value calculation and continuous monitoring of the distances and hence analysis of changes. According to the invention, a highly sensitive rangefinder is integrated into the projecting unit of the device, the beam paths of measuring beam and projection beam being coaxially coupled.

By repeatedly travelling over the defined measuring path with the projection of the measuring beam, distance variables can be determined in each case for points of the measuring path during each pass and these distance variables can be accumulated, i.e. collected, and in particular averaged, for determining the distances to the points. The multiple passes through the measuring path and the resulting data record permits the determination of the distance to many points of the path covered at a high measuring rate, so that, for example, a 3D model of the complete path can be derived, which permits, for example, the highly precise and automatic creation of the ground plan of a room.

The basis for this is the multiple angle-synchronous passage through one and the same measuring path which thereby permits repeated reception of measuring radiation of a measuring point and hence the accumulation thereof. This accumulation can be very close to the radiation level, i.e. for example as charge carrier accumulation in a photosensitive element or can take place at the level of signal processing, for example by storage and summation of digitized values. In principle, measured distance values can thereby be either determined during each pass and output continuously or subsequently further processed, for example averaged, or the distance determination takes place only after a multiplicity of passes, for example on the basis of the charge carriers accumulated until then for each measuring point or aggregated signal. In the case of continuous distance output, so-called IIR filters (infinite impulse response) are suitable; these digital filters are suitable in particular for fast processing and improvement of measuring sequences.

The measuring rate and hence the design of the distance-measuring unit are dependent here on the angular velocity on passing through the trajectory, this in turn being specified by the detectability by the human eye or an electronic detector. The typical measuring rates associated with such conditions are in the range from 1 kHz to a few 1000 kHz. Further properties of the system which are to be realized are a radial accuracy of measurement of less than 3 mm, a lateral resolution along the measuring path of less than 5 mm over 20 m and an application distance of at least up to 50 m.

Transit time meters of the prior art can be designed to be single-channel and hence coaxial but conventional realizations with mm accuracy all have a slow measuring rate in the Hz range since the accuracy is achieved only by averaging over a large number of laser shots.

Fast phase meters up to a few hundred MPts/sec are also known but such apparatuses are susceptible to channel crosstalk, in particular in the case of coaxially arranged beam paths. In the case of biaxial or morphologically separate measuring beam paths, such a rangefinder can in principle be used.

A rangefinder suitable for the integrated approach according to the invention is described below. It utilizes a transmitted beam and a received beam in coaxial arrangement. The measuring principle differs both from a classical transit time meter and from phase meters. Although the distance is derived from a measurement of the transit time as in the case of a transit time meter, in contrast the radiometric variables, such as laser power and modulation frequency, tend to be those of a phase meter. Such a rangefinder is capable of measuring the distance with mm accuracy at a rate of a few kHz to a few MHz, in particular up to about one MHz, without exceeding the limits of laser class 3R.

The integration of such a highly sensitive rangefinder can be combined with an angle sensor. As a result, local coordinates in a plane or on a cone can be determined. The angle sensor or encoder determines the angle of rotation of the projected reference beam. With the data of the angle encoder and of the rangefinder, for example, the coordinates of marked, identifiable structures, such as, for example, door opening or window width, or of reflecting object marks can be determined with high precision.

If the distance-measuring unit is installed in a grade laser, i.e. a rotary laser having an angle of inclination adjustable relative to the perpendicular direction, the local coordinates (x, y, z) can be determined, at least in a limited grade or inclined range.

In addition to the applications in a horizontal or defined skew position, the system according to the invention can also be realized in a so-called lay-down variant. In this embodiment, the device projecting a reference line lies on its side and is placed on a turntable so that the device can rotate about a vertical axis provided with a further angle sensor. The rotation about the vertical axis is preferably executed in steps or intervals, which has the advantage of repeated recording of the respective surface profile and hence aggregation of the point coordinates. As a result of the stepwise rotation about the vertical axis, the entire room can be scanned. This embodiment therefore has the function of a scanner producing point clouds, but with less complexity in comparison with the conventional solutions.

The integration of such a rangefinder into a system projecting a reference line and equipped with an angle encoder also permits control of the projection on the basis of the information determined, such as, for example, the surface topography. By means of the known object data in a plane of rotation, for example, positions of drilled holes can be visually displayed, and positions of set-out points below and above the horizontal reference line can also be marked by use in a straight laser. In order to make points or limited line regions detectable, the projection beam is switched on only in the intended regions to be set out.

Particularly in the case of a system projecting a reference line and having a scanner functionality, i.e. the ability for scanning surveying of cohesive two-dimensional sections, the trajectory can be adapted, after determination of the surface profile, to a curved surface so that the shape thereof corresponds to the undistorted contour of the body or object to be set out. Moreover, after identification of structures, information relating to these can also be provided or projected. For example, after the scanning survey along the measuring path, a window can be identified. Once the system has this automatically determined information about the position, shape and attitude of the window, for example, markings can be automatically projected at a certain distance from the window opening.

In a similar manner, a device or method according to the invention can also be used for acceptance of construction work or for verification of required quantities by automatically recording profiles of surfaces and comparing them with existing theoretical profiles. For example, ground plans of rooms can thus be checked by surveying walls or room heights by recording of lateral profiles.

Moreover, it is possible to realize embodiments of the device which are also capable of measuring the 3D position of the laser light spot on the object or the coordinates of a reflecting target-marking object. This requires either a precise determination of the two emission angles, azimuth and elevation, or a direct measurement of the position of the measuring point, which can be effected, for example, by use of a cooperative target object having its own measuring functionality. If, for example, the reflecting target-marking object is a so-called "smart receiver", i.e. an intelligent receiver or reflector with its own distance-measuring function or at least the ability to determine its own vertical position, the vertical position of the reflector as a measuring point can also be included in the coordinate measurement.

Optionally, a coordinate of any desired point in the extension of the axis of the intelligent target-marking unit can also be determined. This determination is preferably effected by a non-contact method, for example by a triangulation sensor or a separate transit-time or phase meter, or mechanically, for example by an extendable stylus.

From the measurement of the surface topography, area or volume determinations can also finally be carried out, further information about the objects surveyed optionally also being included. Thus, the cross-section of a pipe can be deduced from the profile thereof or, with a knowledge of the length, the volume thereof can also be deduced. Another example is the detection and surveying of the walls of a room. From the geometry thereof, the area of the room can automatically be determined and hence, for example, the floor covering requirement can be calculated.

BRIEF DESCRIPTION OF THE DRAWINGS

The method according to the invention and the device according to the invention are described in more detail below, purely by way of example, with reference to specific working examples shown schematically in the drawings. Specifically.

DETAILED DESCRIPTION

Figure 1:
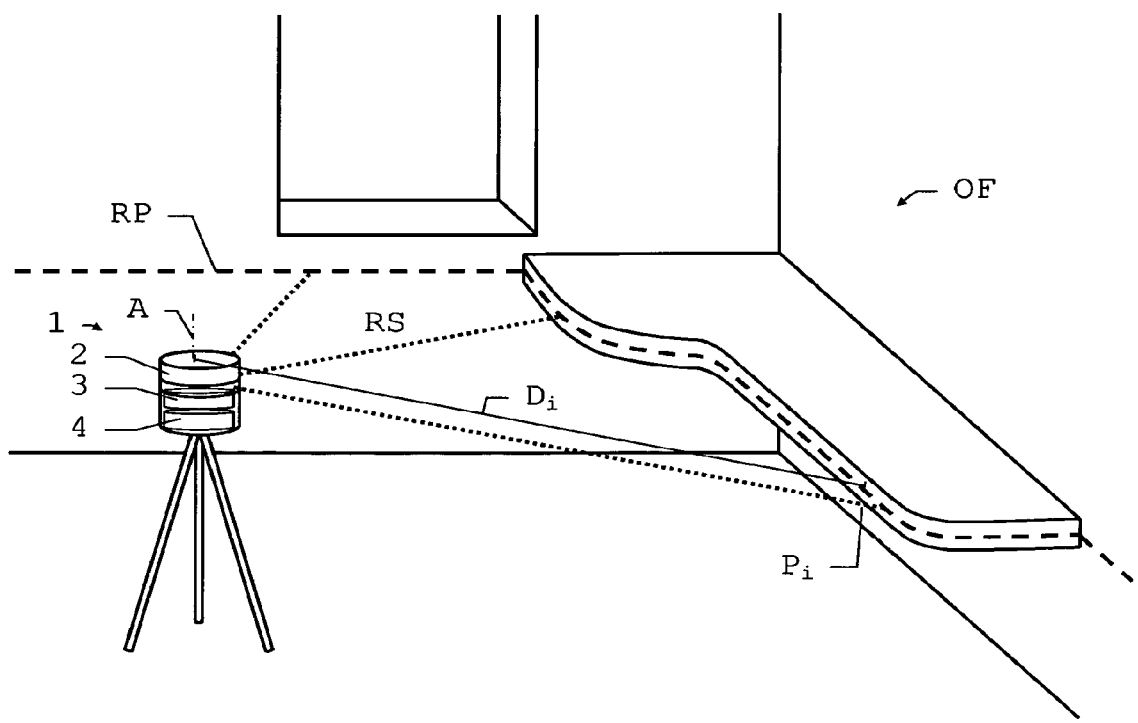
FIG. 1 shows a schematic diagram of the method according to the invention.

FIG. 1 shows a schematic diagram of the distance-measuring method according to the invention for a device 1 projecting a reference line and comprising an electro-optical rangefinder. The device 1 produces optical radiation which is guided through an optically transparent opening or hood 2 as optical reference beam RS and along a defined reference path RP, at least a part of the reference path RP being detectable during its passage by the human eye and/or detectors as a reference line. The guidance of the emission is effected by a beam deflection means 3 as a means for guiding the reference beam RS, which means is moved by a drive 4.

Further processing operations can then be related, with respect to their positioning, to the reference line produced by the reference beam RS, for example by measuring the distance to a reference line projected visibly onto a surface. In addition to the visible projection or projection detectable by a detector on a surface, however, a projection which is detected by a detector on striking said detector is also possible. In both cases, the reference line has more than only a single point, so that it is possible to determine a path of the reference line.

According to the invention, a distance measurement to at least one point $P_i$ of the reference path RP, but in particular to many points $P_i$, for example if these serve for scanning a section of the reference path RP, is effected. The measuring principle here is based on the emission of a measuring beam parallel to or coaxial with the reference beam RS or the use of the reference beam RS as a measuring beam and subsequent reception of parts of the reflected measuring beam and derivation of a signal from these parts. Here, the corresponding signals can be recorded with a measuring rate of 1 kHz or more. In each case an angle measurement or angle determination of the deflection direction to the point $P_i$ is effected synchronously with the distance measurement.

The determination of the distance $D_i$ to the at least one point $P_i$ is based on the modulation and evaluation of the signal, which is shown below in FIGS. 3 and 4, it also being possible for the guidance along the reference path RP to be repeated. On each passage through the reference path RP, in each case a distance $D_i$ or a distance-related variable, such as, for example, the signal shape or phase, is determined per angle position of the receiver for at least one point $P_i$. After a few passes, the distance $D_i$ can then be determined from the distance-related variables. Thus, the parts of the measuring beam which are received for the at least one point $P_i$ can be accumulated by the repeated passage through the reference path RP and/or the coordinated signals thereof can be aggregated.

In the case of the rotary laser shown here as device 1 projecting a reference line, continuous scanning of the reference path with a multiplicity of repeating passes through the same projectory and the angular resolution corresponding to repeated surveying of the identical points is possible through the rotational speed of the reference beam RS, the reference path RP being specifiable in a defined and variable manner. In the case of a rotary laser, for example, the plane of rotation can be tilted by changing the attitude of the axis A so that correspondingly skew planes (grades) can be realized. With appropriate control means, however, free-form figures can also be projected as reference lines or scanned in a distance-measuring manner. In order to realize the function projecting a reference line, the guidance along the reference path RP can be effected at a speed such that, during the passage, the reference path RP is simultaneously perceptible to the human eye in its totality. In the case of the rotary laser, the user then sees a continuous line projected all round on the wall. Here, the emitted radiation advantageously has a wavelength in the visible range but in principle induced fluorescence or similar effects can also be utilized. The measuring beam can be collimated and may have a beam cross-section with a diameter of 5 mm or less.

Figure 2:
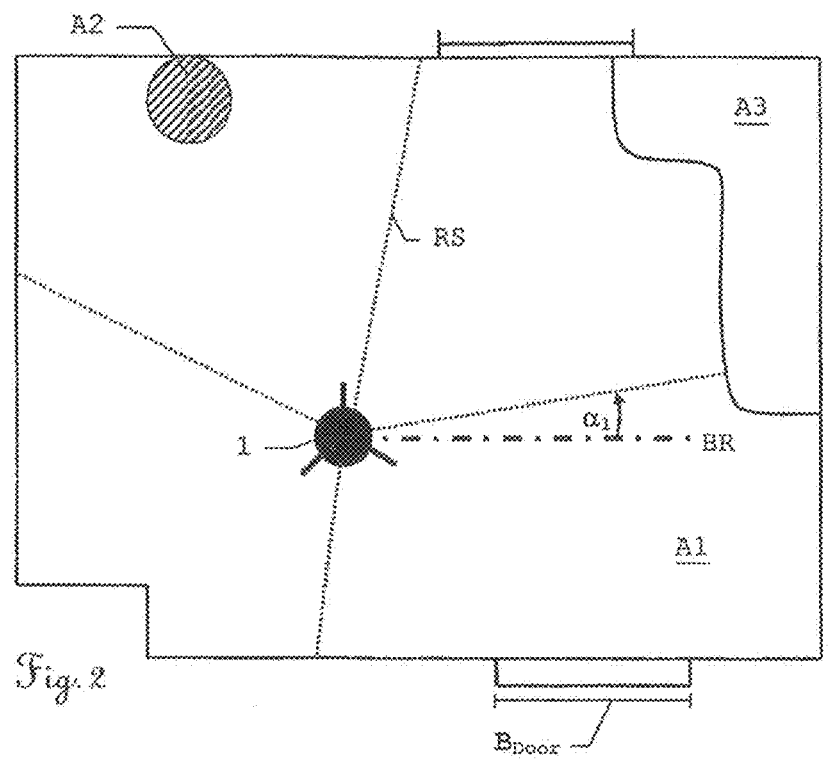
FIG. 2 shows the schematic diagram of FIG. 1 in plan view.

In the example shown in FIG. 1, the rotary laser is positioned so that the height and orientation of its projected laser plane corresponds to a worktop in the corner of a room, so that the reference path RP comes to lie on the edge thereof and the worktop is automatically surveyed. Such a disposition, in particular a horizontal one, permits, for example, surveying of areas, as illustrated in FIG. 2 by means of the schematic representation of the situation shown in FIG. 1, in plan view. By means of the reference beam RS, which simultaneously represents the measuring beam in this example, the room is scanned in an angular range of 360° in a plane and hence two dimensionally, a pipe and the worktop in the corner being detected and being surveyed. The reference path thus lies in a plane produced by the rotation of the reference beam RS as an optical measuring beam about a vertical axis, the rotation being effected, for example, with a defined angular velocity of at least $4\pi$ rad/s. In the determination of the distance to the points, the relative position thereof in the reference path is determined, in particular the associated directional angle $\alpha_i$ relative to a device-internal or external reference direction BR being measured. The orientation or zero direction can be established relative to an external coordinate system.

For the angle determination about the axis of rotation, fast angle encoders with second accuracy can be used. If the angular velocity is defined and is kept sufficiently constant, the angle $\alpha_i$ can also be determined on the basis of the time allocation, so that a component directly measuring the angle can be dispensed with.

On the basis of the recorded surface profile, the area of the room A1, the cross-sectional area A2 of the pipe and the area A3 of the worktop can then be determined. The contours and borders of the objects to be surveyed are then obtained partly from the measurements along the reference path and by calculation or assumption for the unscanned or unscannable region. In this example, the back, i.e. the side facing away from the device 1 can be estimated from the course of the walls of the room to the left and right of the worktop. Alternatively or in addition, a further measurement above and below the worktop can also be carried out, so that the wall profile located behind can also be directly scanned. However, it is advantageous if basic geometric shapes are stored as measurement or computational information in the device 1, which information can be appropriately selected. Moreover, the width $B_{Door}$ of a door leading to the room can be determined in an automated manner.

Figure 3:
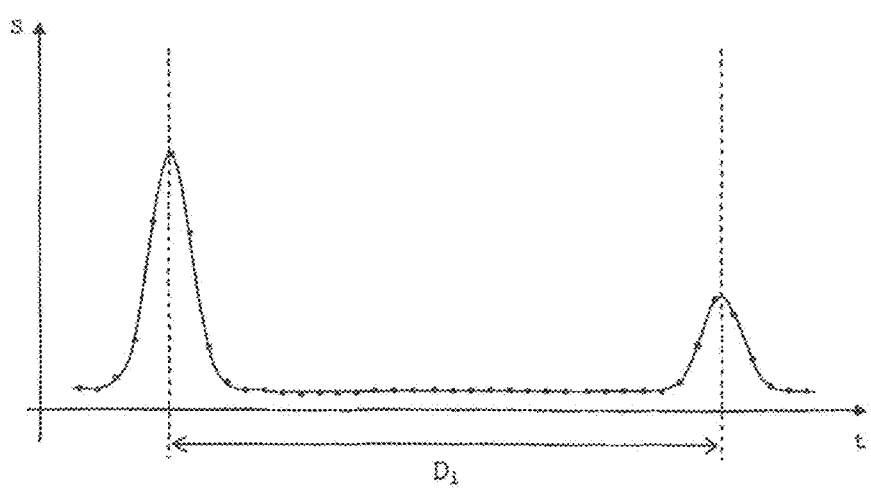
FIG. 3 shows a schematic diagram of the distance-measuring principle for a method according to the invention.

FIG. 3 explains a preferred distance measurement principle for a method according to the invention on the basis of a schematic representation of a typical signal sequence as occurs in an electronic rangefinder. The variation of the signal relative to the time axis is shown, the points designating scanning or sampling points. Here, the left pulse is a start pulse and the right pulse is a stop pulse, as in the case of transit time meters. The transit time and hence the distance $D_i$ follow, for example, from the time interval between the peaks of the two pulses, the pulses being scanned similarly to phase meters. A corresponding method is explained in its principles, for example, in the International PCT application with the application number No. PCT/EP2007/006226. The solution there is based on the combination of two basic principles for signal detection which are customary in distance measurement. The first basic principle is based on measuring signal detection by means of the threshold value method and the second basic principle is based on signal sampling with subsequent signal processing for identification of the signal and determination of the position of the signal as a function of time. In the threshold value method, in general the signal detection is established by the signal amplitude exceeding a threshold value, but the distance-determining signal feature may be very different. Firstly, the ascending flank of the received signal can initiate the time trigger; secondly, however, the received signal can be converted by means of an electronic filter into another suitable shape in order to generate a trigger feature which is advantageously independent of the pulse amplitude. The corresponding trigger signal is fed as a start signal or stop signal to a time measurement circuit.

The two approaches are used in parallel for signal detection, i.e. a received pulse or a signal structure is detected by both methods, which generally implies simultaneity or at least overlap of the methods with regard to time.

The core of the principle is loss-free signal acquisition, loss-free being understood as meaning the retention of the transit time information. The approach here is based on direct signal sampling of the received time signal in the GHz range. The received signal preamplified by means of a broadband but extremely low-noise transimpedance receiver is sampled with a fast AD converter and quantized with at least 8 bit. Such a transimpedance amplifier is described, for example, in the European patent application with the application number No. 07114572. This AD converter is distinguished by a low INL (integral nonlinearity) and an aperture jitter negligible in the range of the accuracy of measurement, aperture jitter being understood as meaning the variation of the sampled points or ranges as a function of time, i.e. of the distance from sample to sample. This AD converter is timed by a highly stable oscillator unit. This is determined substantially by the track-and-hold unit at the input of the AD converter, typical values being 1 to 2 psec.

INL is understood as meaning the transfer function of the quantization unit implemented in the AD converter, which transfer function deviates from a straight line over the dynamic range. An ideal AD converter converts the amplitude of an analogue input signal proportionally into a digital code at the output. In the real case, however, the deviation may be about 0.3 LSB, which can lead to troublesome signal distortions. This aspect is particularly important for ensuring an accuracy of measurement in the case of large and small amplitudes. Measures for eliminating these influences are known; for example, some AD converters have a so-called self-calibrating function which measures the INL from time to time and reduces it correspondingly internally.

In the signal profile shown, the sampling points are distributed in an equidistant manner, the distances being maintained with an accuracy of less than 5 psec. The analogue bandwidth of the analogue receiver connected upcircuit of the AD converter is in the range from 40 to 400 MHz, as a result of which the input signal present at the AD converter is smoothed over a plurality of sampling intervals. What is important is that the AD converter firstly does not reduce the signal-noise ratio but secondly does not falsify the signal transit time to be measured or impose time-relating noise on it.

The stop pulse is guided by the transmitting unit to the target object being surveyed and is passed to a photodetector via a receiving optical system. The resultant time signal contains at least one start pulse and, corresponding to each optically irradiated target, a stop pulse.

The sampling sequence after the AD converter is fed to an FPG (field programmable gate array) or a PLD (programmable logic device) and processed there in real time. In a first step, for example, the sampling values are temporarily stored in a digital signal vector. The length of such a data record determines the maximum distance to be measured. If, for example, 8192 samples with a sampling rate of 1 GS/sec are temporarily stored, this record length corresponds to a time axis of 8192 nsec, which in turn is equivalent to a maximum distance of 1229 m.

A signal analysis follows in a second step: the time axis, or the digital signal vector, is searched to find a start pulse and any stop pulses. The position of the pulses is therefore known accurately to a sampling interval. The difference corresponds to a first rough estimate of the distance $D_i$ to be determined.

For improving the accuracy of measurement to even below the sampling interval, various hardware- and software-based methods are known. For example, interpolation to typically one hundredth of the time interval is possible by means of centroid evaluation of the two pulses. Further methods are digital Fourier transformation (DFT) with phase evaluation or differentiation with zero crossover determination. Preferably, however, evaluation methods which are robust with respect to signal distortion and saturation are used; here, approaches from digital filter and estimation theory are often employed. With such methods, accuracies of measurement of 1 mm are achievable.

Figure 4:
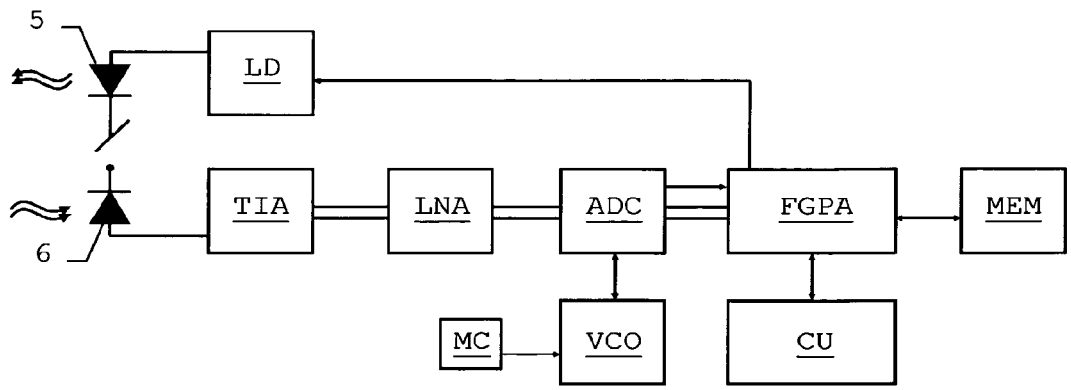
FIG. 4 shows a schematic block diagram for carrying out the distance-measuring principle.

The circuit used for realizing this principle of measurement is shown in FIG. 4 as a schematic block diagram.

A beam source 5, for example a laser diode, with corresponding actuation LD, is present at the beginning of the signal chain, a first part of the radiation being passed internally directly to the receiver 6 and a second part of the radiation being passed externally to the target object to be surveyed. The radiation reflected by the target is then fed via a receiving optical system, likewise to the receiver. The signal chain on the receiver side has a subnanosecond photodetector as receiver 6, e.g. an avalanche photodiode, a broadband and low-noise current-to-voltage converter TIA having a limiting frequency adapted to the laser pulse, as described, for example, in the European Patent Application with the application number No. 07114572, a voltage amplifier LNA which produces as little distortion and noise as possible and at least one high-speed AD converter ADC.

The broadband and low-noise current-to-voltage converter TIA, for example as a transimpedance amplifier circuit for converting an input current into an output voltage $U_{out}$, may be composed of amplifier element with signal input and output and a T-shaped feedback network. With optimally dimensioned feedback networks, linear amplifiers having bandwidths of more than 500 MHz and low input noise currents can be realized.

The T-shaped feedback network has first, second and a third branch, which in each case are connected on one side to a node K. The first branch, which is connected on the other side to the output of the amplifier element, has a feedback resistance $R_1$. This feedback resistance $R_1$ results in a current noise $I_{noise}$, which is given by $$I_{noise,R_1} = \sqrt{\frac{4kT}{R_1}}$$

T representing the absolute temperature and k representing the Boltzman constant.

The current $I_{R1}$ flowing through the feedback resistance is capacitively divided at the node K so that only a part of this current—and hence also only a part of the noise current—is fed back to the input of the amplifier element. For example, an amplifier circuit having a lower noise can now be realized by this current division—viewed in relation to the transimpedance of the circuit.

For this purpose, the second branch of the T-shaped feedback network has at least one capacitive component $C_2$ and the third branch, which leads to the signal input of the amplifier element, has at least one capacitive component $C_3$.

The signal lines between the components of the receiver circuit are preferably led differentially. The signal chain on the receiver side can also be divided into a plurality of paths having different amplification. Each of these paths is then led to a corresponding AD converter. Standard AD converters typically have two or more input channels. As a result, the received signal dynamics can be extended.

The digital signal sequences are passed further into at least one FGPA or one PLD (programming logic device) for signal shaping and processing. The resources of present-day FPGA are adequate for evaluating the distance evaluation between start pulses and stop pulses in real time operation with a rate of up to 1 MPts/sec and outputting it at a high-speed interface. Fast FPGAs moreover permit a calculation synchronous with the distance evaluation and output of the signal strength, in particular that of the stop pulse. By carrying out the calculation processes simultaneously, it is also possible to rely on energy-saving PLDs. A memory unit MEM is provided for storing the data.

In the case of weak received signals, it is possible to changeover from single shot mode to accumulation mode, depending on the situation. In this mode of operation, the FPGA sums the digital signal vectors belonging to the measuring sequences synchronously in time with the laser shot rate and stores the data in a correspondingly long memory. The distance is calculated and output with a time lag but continuously. This method has the advantage that even very weak received pulses can be measured and the speed of measurement still remains high.

If objects, such as, for example, interior rooms, are repetitively scanned, i.e. profiles are recorded, it is also possible to use another method for increasing the sensitivity of measurement, based on multiple measurement of the same profile. In this case, distance measurements are determined by the single shot method but simultaneously an accumulation mode is activated which stores the measured distances corresponding to the scanned profile in an additional memory. The memory length corresponds exactly to the number of points on a profile track and depends, inter alia on the repetition or rotation frequency. In this mode of operation, the FPGA sums distances which correspond in each case exactly to an associated point on the object profile. Here, the length of this profile memory corresponds to a track transversely over the object to be surveyed. Here too, the continuously improving distance can be continuously updated together with the measured angle value and can be output. This method too, has the advantage that weakly reflecting rooms and objects can be surveyed or scanned accurately.

The basis for the accurate transit time measurement is derived from a temperature-corrected quartz oscillator MC. Said quartz oscillators are commercially available and have a typical clock accuracy of 0.2 ppm. The time signal or clock signal of the quartz oscillator is scaled up by means of a PLL oscillator VCO, for example to 1 GHz, with little noise. The output signal of the oscillator VCO forms the time signal of the AD converter, with picosecond accuracy. The latter passes the time signal or clock on a PIN especially provided for this purpose to a digital clock manager; this unit can be in the form of a state machine in the FPGA. This digital clock manager has, inter alia, the function of generating, on the laser trigger line, the configured laser shot frequency synchronously with the AD converter with picosecond accuracy.

The distance measurement circuit together with detector actuation, temperature sensors and any adjustable optical attenuators is controlled by a central control unit CU.

Figure 5:
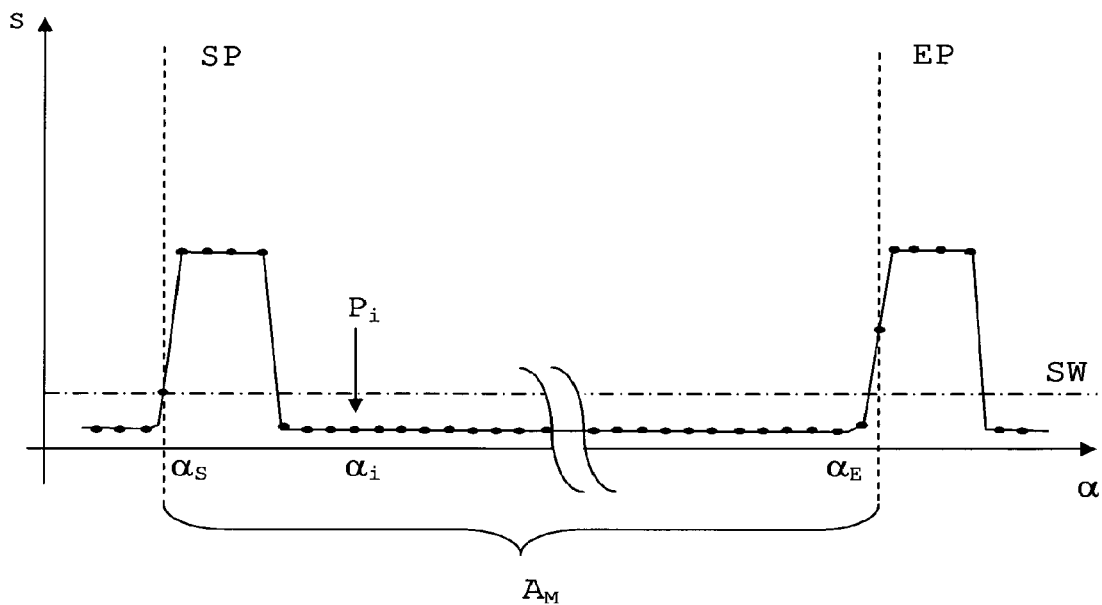
FIG. 5 shows a diagram of the signal curve for an example of use of the distance-measuring principle.
Figure 7:
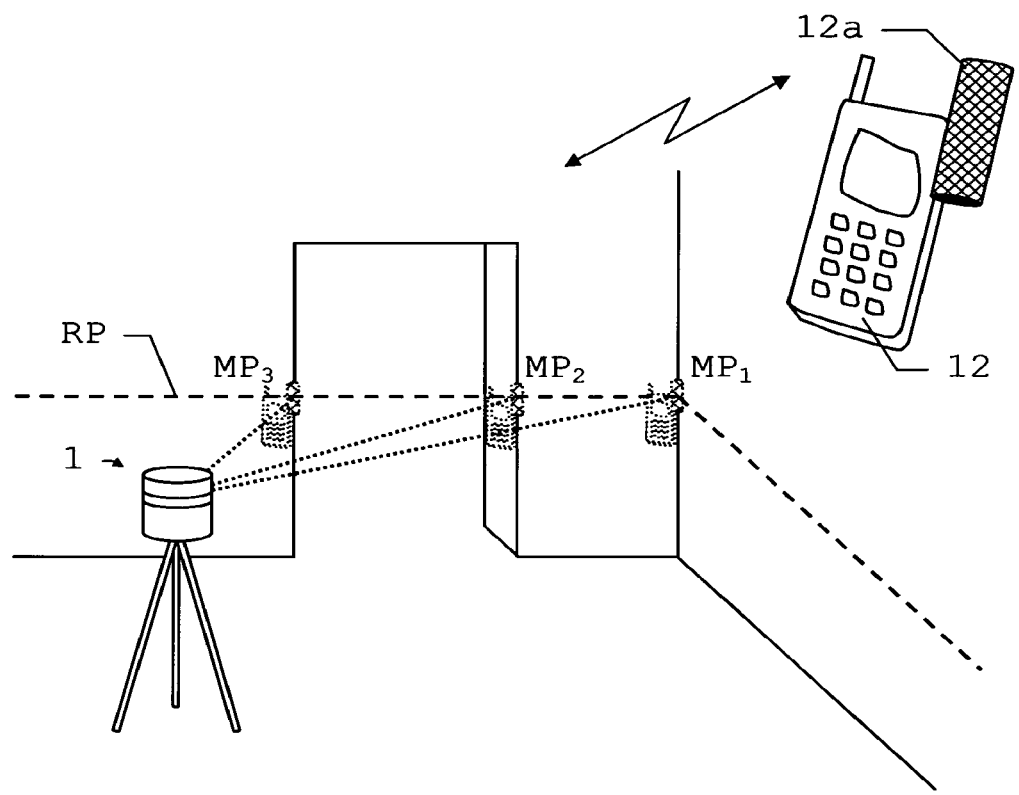
FIG. 7 shows the schematic diagram of a first example of use of the method according to the invention with a cooperative target.

If target points are marked by cooperative target objects, such as, for example, reflectors, a scanning sequence can also be initiated from the signal curve, which is represented in FIG. 5 as an example of use of the distance measurement principle. As shown in FIG. 7, measuring points can be made detectable by reflectors since a corresponding increase in the signal strength as a function of the measuring point number or the angle in the profile occurs as a result of the increased reflectivity compared with the noncooperative background. The marking of measuring points thus permits the initiation of an automated measuring process, which is illustrated in FIG. 5 for the example of the recording of a surface profile between two reflectors. During the spatial scanning movement, the receiver detects an increase in the signal intensity which, after exceeding a threshold value SW, leads to the initiation of a continuous distance measurement process with recording of the corresponding data, i.e. of measuring points $P_i$ and coordinated angles $\alpha_i$ and in particular coordinated intensities as point attributes. The first intensity increase therefore defines, by means of the first sampling value which is above the threshold value SW, a starting point SP, which is terminated again in the same way by the first threshold-exceeding sampling value of the second intensity increase as end point EP. By means of starting point and end point SP, EP, a profile window of the record length $A_M$ is therefore set. In addition to such initiation of a measuring or registration sequence, this can also be triggered manually, with angle control, i.e. with a start angle $\alpha_S$ and an end angle $\alpha_E$, by specification of a stored measuring sequence or in another way.

Figure 6:
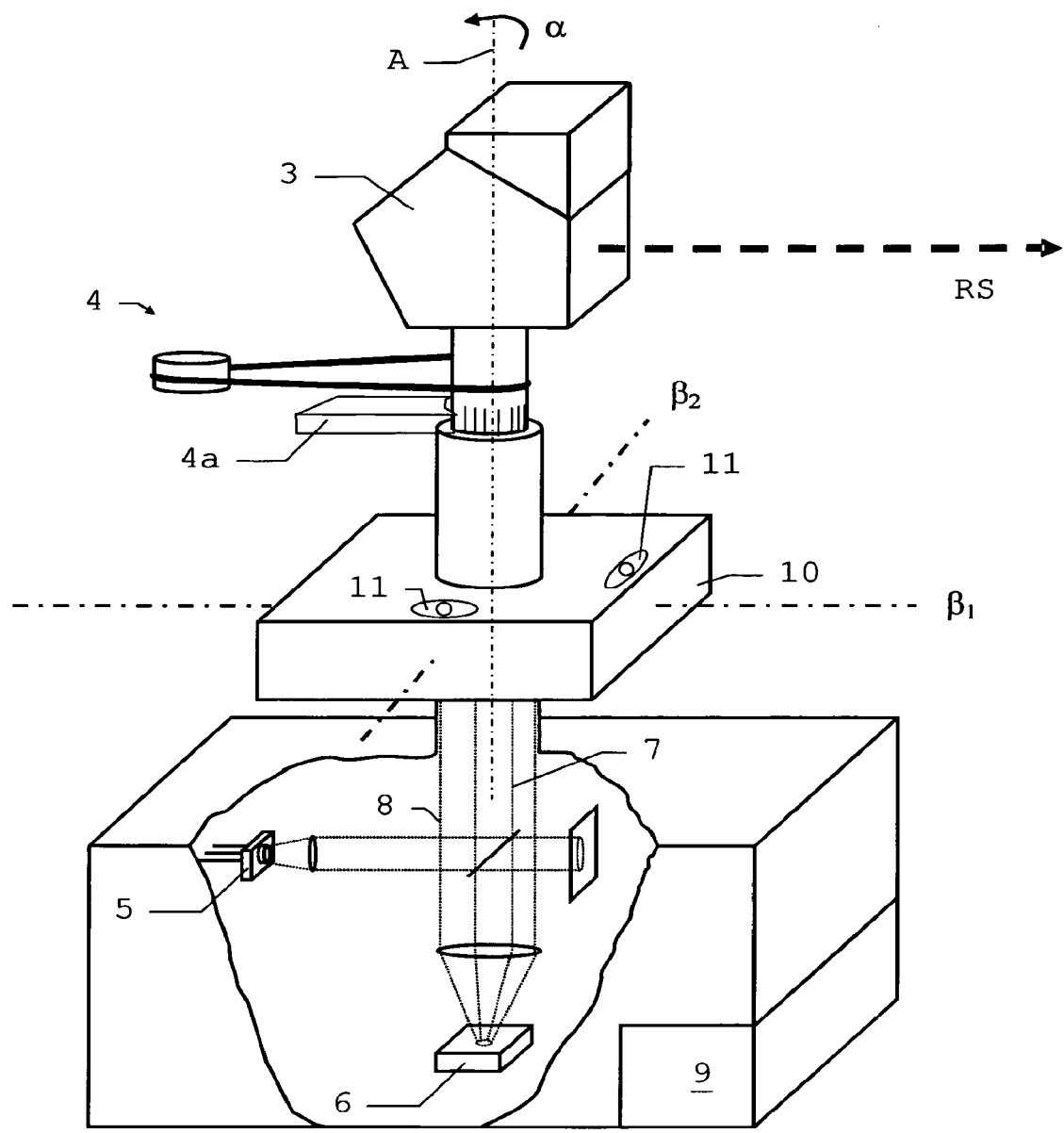
FIG. 6 shows a schematic diagram of a first working example of the device according to the invention.

A first working example of the device according to the invention which projects a reference line is shown schematically in FIG. 6. The device has a beam source 5, for example a laser diode, for generating a reference beam RS, which simultaneously serves as a measuring radiation 7 and is emitted via the beam deflection means 3 moved by a drive 4 about an axis A, as a means for guiding the reference beam RS. In this embodiment, which is realized purely by way of example with a pentaprism as beam deflection means 3, the deflection angle is 90 degrees, so that the reference beam generates a plane. Here, the drive 4 is shown merely by way of example via a belt. According to the invention, a very wide range of drive components known to the person skilled in the art, for example by means of gears or directly driving hollow-shaft motors, can be used. In this working example, a mirror is used as a beam deflection means 3 mounted in a fixed manner relative to the axis A, the axis A of rotation of which can be oriented vertically via a tilting table 10, in particular on the basis of inclination sensors 11. Alternatively, however, a moveable or rotatable beam source can also be used, so that a beam deflection means 3 can be dispensed with. In this special embodiment, however, the means for guiding the reference beam RS have the moveable beam deflection means 3 which generates a horizontal plane, but this too can be tilted about two angles of inclination $\beta_1$ and $\beta_2$, so that the axis A can be oriented in a defined direction, inclined by a defined angle $\beta_N$, relative to the vertical plumb direction.

With the pentaprism as beam deflection means 3, the reference path RP lies in a plane perpendicular to the axis A and the measuring beam rotates about the axis A, in particular at a defined angular velocity of at least $4\pi$ rad/s. The respective positions of the beam deflection means 3, i.e. the emission angle of the measuring beam, can be derived by means for determining the angle $\alpha_i$. For example, the position can be measured directly by additional angle sensors 4a or angle sensors 4a belonging to the drive 4 or, at constant rotational velocity, can be determined by coordination with the time of emission. In principle, the measuring radiation may be in the form of emission parallel to or coaxial with the reference beam or the reference beam RS itself may be used as the measuring beam, this being controlled accordingly by an electronic distance-measuring unit.

The characteristic of the radiation to be emitted is chosen so that at least a part of the reference path RA is detectable as a reference line by the human eye and/or detectors during its passage.

The parts 8 of the measuring or reference beam RS which are reflected by a surface are in turn led via the radiation deflection means to receiver 6 as a photosensitive receiving component which is part of the electronic distance-measuring unit. Distances $D_i$ to points $P_i$ in the reference path are determined in an evaluation unit 9, this being designed so that, with an appropriate choice of a mode, the reference path contains at least one point which is measured on passing through the reference path for determining its distance $D_i$. The device can be adjusted so that the means for guiding the reference beam RS are actuated so that repeated, in particular, multiply repeated, passage through the reference path automatically takes place, resulting in a continuous data record for distance determination. For this purpose, the evaluation unit 9 can have or a program, with the result that the measured beam signal 8 measured on repeated passage through the reference path for the at least one point $P_i$ is accumulated and/or coordinated signals are aggregated. Preferably, digitized signal values are fed to filter banks which continuously average the measured values and thus lead to improved coordinates. For fast measuring point sequences, IIR filters are particularly suitable, by means of which noise suppression can be realized on-line by frequency filtering.

In order to ensure scans which result in a visible projection of the reference line, it is advantageous if the reference beam is rotated with about 2 to 10 Hz; the distance-measuring unit should have a measuring rate of at least 1 kHz so that the profile points are sufficiently close together on the reference path.

In this embodiment, the device therefore has a transmitted beam path 7 between the laser source and the means for guiding the reference beam RS and a received beam path 8 between the means for guiding the reference beam RS and the receiver 6, the transmitted beam path 7 and the received beam path 8 being arranged coaxially with or parallel to the axis A. In addition, a part of measuring beams emitted by the beam source 5 can be guided internally in the device to the receiver 6.

FIG. 7 schematically illustrates a first working example of the method according to the invention with a cooperative target. Here, a device 1 projecting a reference line is positioned in a room, with the result that a plane serving as a height reference is projected onto the walls by means of reference path RP. A plurality of measuring points $MP_1$-$MP_3$ can be specified along this height line by positioning of a marking unit 12. The device 1 thereby recognizes a reflecting element 12a which is mounted on the marking unit 12 and serves for characterizing a point $P_i$ of the reference path RP. The device 1 now links positions associated with the reflections of the reflecting element 12a with the measuring points $MP_1$-$MP_3$, which, for example, permits the establishment of structural features in the room or the initiation of processes, for example scanning or the measuring of a lateral distance. With such a surveying system comprising device 1 projecting a reference line and marking unit 12, it is therefore also possible to define and measure distances to surfaces. In general, partial profiles between measuring points $MP_k$ can be recorded in a defined manner by marking units. Advantageously, the device 1 projecting a reference line and the marking unit 12 have communication means for producing an at least one-sided, in particular a mutual communication link so that data can be transmitted or the device 1 can be remote-controlled via the marking unit 12.

In the horizontal disposition of the device 1, shown in FIG. 7, only the coordinates with points in a corresponding horizontally oriented plane are surveyed. If the device is in the form of a grade laser, i.e. having an inclinable plane of rotation, it is possible to measure to each point of the room and to determine the coordinates (x, y, z) thereof.

Figure 8:
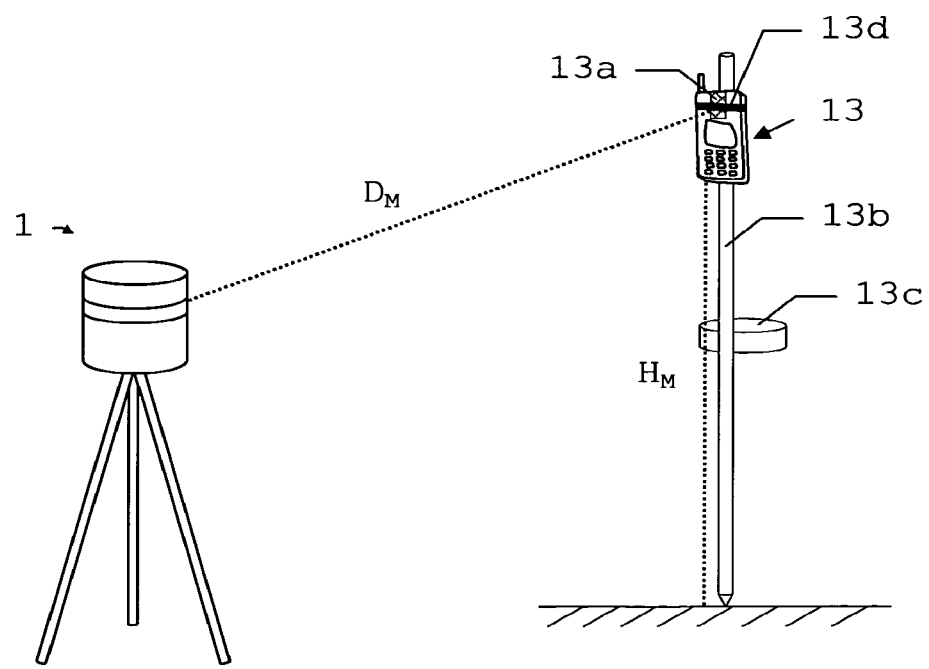
FIG. 8 shows the schematic diagram of a first example of use of the method according to the invention with a cooperative target.

FIG. 8 shows the schematic diagram of a second example of use of the method according to the invention with a cooperative target. In this example, a marking unit 13 which is capable of determining its own height $H_M$ is used, which can be effected either by its own distance-measuring functionality relative to the floor or a mechanical distance determination. For example, in addition to a reflecting element 13a which may also carry a zero height mark 13d, the marking unit 13 may also have a plumbing staff 13b and a level as inclinometer 13c. The marking unit 13 can then be positioned with the tip of the plumbing staff 13b on the floor and brought to a vertical position by means of the inclinometer 13c so that the height is defined by the position of the reflecting element 13a, together with the zero height mark 13d on the plumbing staff

13b. Here, the reflecting element 13a can preferably also be arranged so as to be displaceable relative to the plumbing staff 13b, it being possible to read the exact height on the basis of a scale.

In one example of use, the surveying of sags in flat roofs can be carried out with such a surveying system. For this purpose, the device 1, for example in the form of a rotary laser, is positioned on the roof, the plane of the reference beams in this case being oriented horizontally. The marking unit 13 is now brought into contact, at the lower end of the plumbing staff 13b, with the flat roof at various points, in particular in the region of depressions or water accumulations. Thereafter, the plumbing staff 13b is oriented vertically and the reflecting element 13a with the zero height mark 13d is moved until it is detected by the measuring radiation of the device 1. This recognizes the reflecting element 13a by means of the signal strength and the coordinated scanning profile, measures the corresponding distance $D_M$ and direction to said reflecting element and communicates this completed measurement to the marking unit 13. Thus, the complete coordinates of the point at the lower end of the plumbing staff are now known. As an alternative to the zero height mark 13d, the reflecting element 13a may also be formed with a detector functionality for the measuring or reference beam so that the marking unit 13 automatically recognises when the reflecting element 13a enters the plane of the reference beam RS, which means that a corresponding height $H_M$ can be read.

This group of examples of use also includes the surveying of squares or slopes having a uniform gradient in a terrain. In the case of these functions, the device 1 produces a family of reference beams which defines a correspondingly inclined plane.

Figure 9:
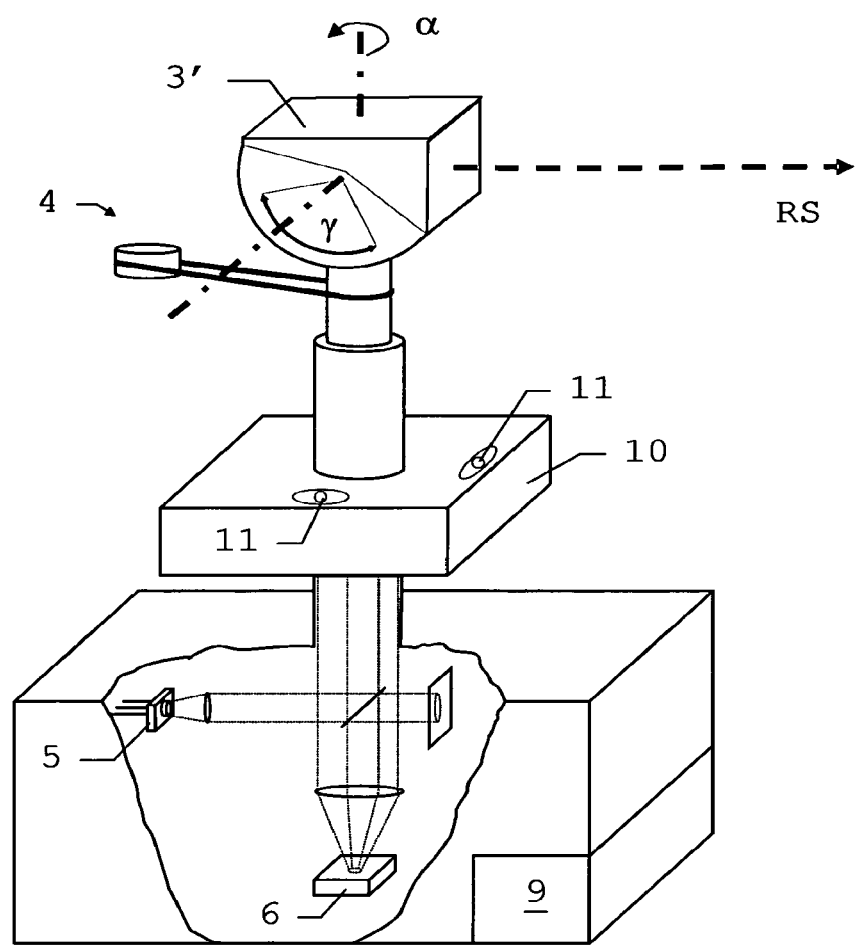
FIG. 9 shows a schematic diagram of a second working example of the device according to the invention.

A second working example of the device according to the invention is shown schematically in FIG. 9. The setup here resembles the device shown in FIG. 6. However, the beam deflection means 3' formed as a mirror surface is now formed so as to be tiltable about a horizontal axis so that rapid adjustments of the emission direction in two angles α and γ can be effected. For example, galvano-mirrors can be used here as rapidly pivotable deflection means. Preferably, the two axes of rotation are perpendicular to one another. By means of such a formation of the device projecting a reference line, the projection of reference lines having in principle any desired shape can be realized. In particular, it is now also possible to project marks or similar information onto surfaces, even with switching off or interruption of the emission from time to time. In addition to the working examples shown in FIG. 6 and FIG. 9 and having mirror surfaces which are rigid but pivotable in one or two axes, further optical components known to the person skilled in the art can be used as beam deflection means and as means for guiding the reference beam. For example, deformable mirror surfaces, e.g. as a micromechanically adjustable component, likewise permit beam guidance in two axes.

Figure 10:
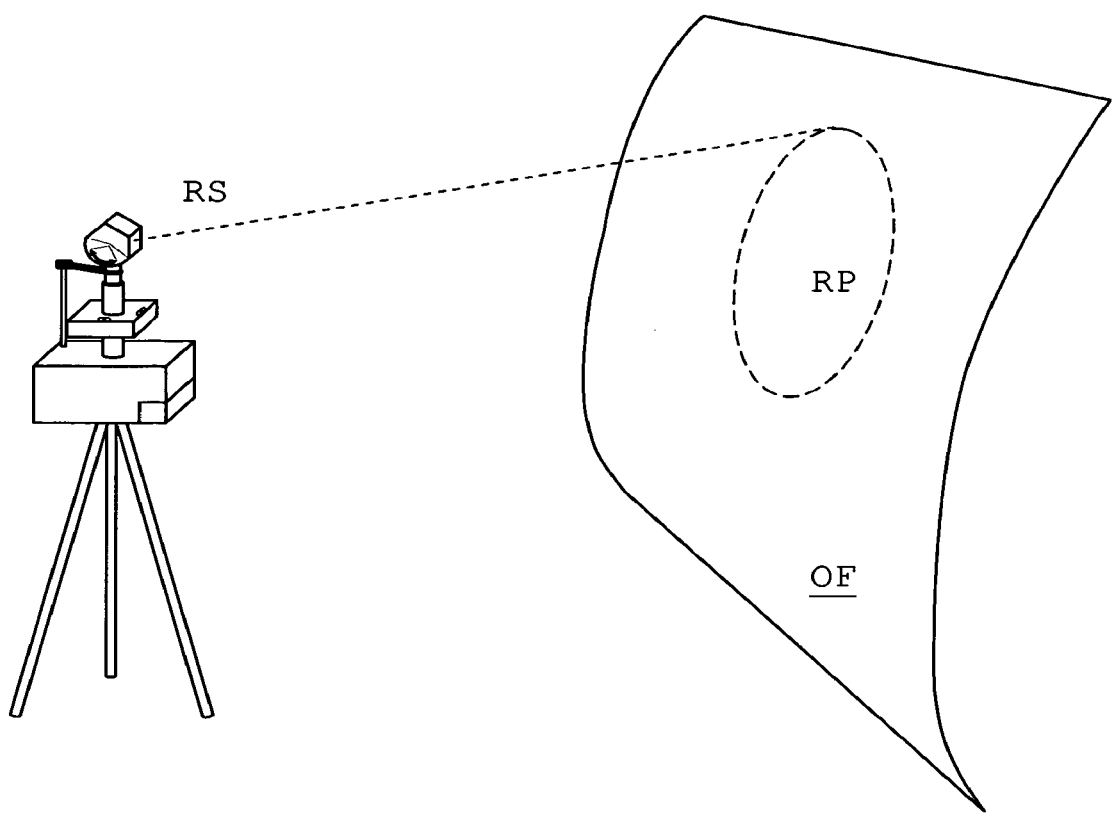
FIG. 10 shows the schematic diagram of an example of use for the second working example of the device according to the invention and FIG. 11 shows a schematic diagram of a third working example of the device according to the invention with naturally reflecting target objects.

FIG. 10 illustrates an example of use for the second working example of the device according to the invention. This device is now capable of generating a surface topography or at least a reference path topography on the basis of the surface scanning and measurement to points. This permits a projection of the reference radiation RS in a manner which compensates project distortion due to the shape of the surface OF, i.e. the projection of the reference path takes place with distortion in a manner which once again gives the intended undistorted image on the curved surface. In FIG. 10, this is shown for the example of a circular cut-out which is to be made in an inclined or additionally curved surface. As a result of the inclination and curvature, a reference line which appears circular on a flat and perpendicular wall will be distorted into an ellipse. Owing to the direction and distance measuring functionality, the topography and orientation of the surface OF can be determined and can be taken into account during guidance of the reference beam RS, so that it is emitted in an appropriately adapted ellipse which, after striking the inclined and curved surface OF, is perceived again as the desired circular reference line. With such a surveying system, for example, the contours of drilled holes or passages for ducts can be set out.

Figure 11:
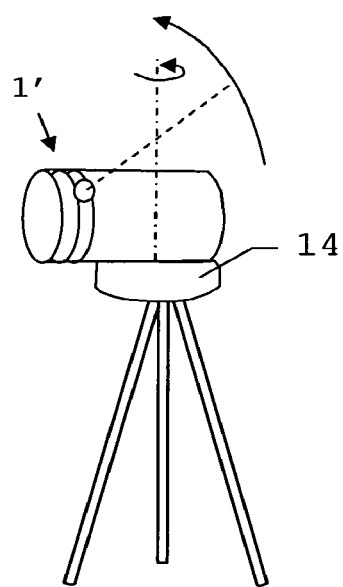

FIG. 11 illustrates a third working example of the device 1' according to the invention. The setup once again resembles the device shown in FIG. 6. In this case, the device equipped with a rotary laser is mounted on its side or on a turntable 14. Preferably, turntable axis and axis of rotation A are perpendicular to one another. The plane of the reference beams is thus parallel to the turntable axis. In this lay-down position with rotation of the device 1' about the turntable axis, together with angle and distance measurement, the 3D coordinates of the entire room can be surveyed. The embodiment therefore has a functionality comparable with a scanner.

Of course, these figures shown represent only examples of possible embodiments. In particular, the internal structure of the device projecting a reference line can also be otherwise realized or can be realized with other components.

What is claimed is:

1. A distance-measuring method for a device projecting a reference line, including an electro-optical rangefinder, the method comprising the steps:
    emitting and guiding an optical reference beam along a defined reference path, at least a part of the reference path being detectable as a reference line in its passage by the human eye or detectors;
    measuring distance to at least one point of the reference path by:
        emitting a measuring beam:
            parallel to, or coaxial with, the reference beam; and
            guiding the measuring beam along the reference path, or use of the reference beam as a measuring beam;
        receiving parts of the measuring beam reflected from the at least one point and deriving at least one signal from these parts; and
        determining the distance to the at least one point from the at least one signal, wherein the guidance of the measuring and reference beam, or of the reference beam used as a measuring beam along the reference path, is automatically repeated at least once.

2. A distance-measuring method according to claim 1, wherein a topography of the reference path is generated on the basis of multiple measurements of the distance along the reference path.

3. A distance-measuring method according to claim 1, wherein a topography of a target surface, on which the reference path is projected, is generated on the basis of multiple measurements of the distance along the target surface.

4. A distance-measuring method according to claim 3, wherein the projection of the reference beam is adjusted to compensate projection distortion due to the topology of the target surface.

5. A distance-measuring method according to claim 3, wherein the projection of the reference path takes place with distortion which once again gives the intended undistorted image on a curved surface topology.

6. A distance-measuring method according to claim 3, wherein a trajectory of the reference path is adapted, according to the determination of the topography that the shape of the reference path corresponds to an undistorted contour of a body or object to be set out.

7. A distance measuring method according to claim 6, wherein the coordinates of the points on the reference path are determined with the aid of the angle associated with the axis of rotation and the angles of inclination relative to the perpendicular in an external reference coordinate system.

8. A distance-measuring method according to claim 1, wherein an automatic identification of a structure along the reference path is established.

9. A distance-measuring method according to claim 8, wherein information relating to the identification of structure are provided or projected.

10. A distance-measuring method according to claim 8, wherein a marking is automatically projected at a certain distance from the identified structure.

11. A distance-measuring method according to claim 8, wherein an area or volume determinations is automatically carried out based on the information relating to the identified structure.

12. A distance-measuring method according to claim 1, wherein a recording of a profile of the reference path on a surfaces and comparing them with an existing theoretical profile is done, wherein information relating to deviations of the recorded and theoretical profile are provided or projected.

13. A distance-measuring method according to claim 1, wherein:
   a combination of two principles for signal detection is used simultaneity or at least overlapping with regard to time;
   for determination of a position of the start pulse and a stop pulse as a function of time a signal sampling is done with:
      a measuring signal detection by means of a threshold value method;
      with a start pulse and a stop pulse as in the case of transit time meters; and
      a signal processing for identification of the signal and signal scanning similar to phase.

14. A distance-measuring method according to claim 13, wherein:
   the signal detection is established by the signal amplitude exceeding a threshold value;
   an ascending flank of the received signal initiates a time trigger, and
   the received signal is converted by means of an electronic filter into another suitable shape in order to generate a trigger feature as a distance-determining signal feature which is independent of the pulse amplitude, and whereof a corresponding trigger signal is fed as a start signal or stop signal to a time measurement circuit.

15. A distance-measuring method according to claim 1, wherein:
   the distance determination is based on a direct signal sampling of the received time signal, by a loss-free signal acquisition, in the GHz range; and
   the received signal is preamplified by means of a transimpedance receiver and is then sampled with a fast AD converter with a track-and-hold unit at the input, wherein the sampling points are distributed in an equidistant manner.

16. A distance-measuring method according to claim 15, wherein an accuracy-improving of the measuring below the sampling time interval is done by an interpolation.

17. A distance-measuring method according to claim 16, wherein the interpolation is done by means of a centroid evaluation of two pulses.

18. A distance-measuring method according to claim 16, wherein the interpolation is done by means of a digital Fourier transformation (DFT) with phase evaluation.

19. A distance-measuring method according to claim 16, wherein the interpolation is done by means of a differentiation with zero crossover detection.

20. A distance-measuring method according to claim 15, wherein an accuracy-improving of the measuring below the sampling time interval is done by an interpolation to one hundredth of the time interval.

21. A distance measuring method according to claim 1, wherein, by the repeated passage through the reference path, the parts of the measuring beam which are received for the at least one point are accumulated and/or the coordinated signals thereof are aggregated.

22. A distance measuring method according to claim 1, wherein the guidance along the reference path is effected at a speed such that the reference path is simultaneously perceptible to the human eye in its totality during the passage.

23. A distance measuring method according to claim 1, wherein at least one angle of inclination relative to the perpendicular is determined.

24. A distance measuring method according to claim 1, wherein the optical measuring beam rotates about an axis orientable relative to the perpendicular and defines a plane used as a height reference with a defined angular velocity of at least $4\pi$ rad/s.

25. A distance measuring method according to claim 1, wherein, on determination of the distance to the at least one point, the angle associated with the axis of rotation is determined.

26. A device projecting a reference line, comprising:
   a laser beam source for generating a reference beam;
   means for guiding the reference beam along a defined reference path, at least a part of the reference path being detectable as a reference line in its passage by the human eye or detectors; and
   an electronic distance-measuring unit:
      for emission of a measuring beam parallel to or coaxial with the reference beam or for controlling the reference beam as a measuring beam;
      having a receiver for receiving parts of the measuring beam which are reflected by a surface; and
      having an evaluation unit for determining distances to points in the reference path, the reference path containing at least one point which is measured on passing through the reference path for determining its distance, wherein the means for guiding the reference beam are actuated so that a multiply repeated passage through the reference path is configured to be automatically repeated at least once.

27. A device projecting a reference line, according to claim 26, wherein the evaluation unit has a circuit which, on repeated passage through the reference path, accumulates parts of the measuring beam which are received for the at least one point or aggregates coordinated signals.

28. A device projecting a reference line, according to claim 26, wherein the distance-measuring unit has a measuring rate of at least 1 kHz.

29. A device projecting a reference line, according to claim 26, further comprising means for determining emission angles of the measuring beam.

30. A device projecting a reference line, according to claim 26, wherein the means for guiding the reference beam have a beam deflection means moveable by an angle, positions of the beam deflection means being capable of being measured by the means for determining the angles.

31. A device projecting a reference line, according to claim 26, wherein the reference path lies in a plane and the means for guiding the reference beam make it possible for the measuring beam to be rotatable about an axis can be oriented by means of inclination sensors with a defined angular velocity of at least $\pi$ rad/s.

32. A device projecting a reference line, according to claim 26, wherein the distance-measuring unit has a transmitted beam path between the beam source and the means for guiding the reference beam and a received beam path between the means for guiding the reference beam and the receiver, the transmitted beam path and the received beam path being arranged partly coaxially with or parallel to the axis, wherein a part of the measuring beam emitted by the beam source being guided internally in the device to the receiver without leaving the device.

33. A surveying system comprising a device projecting a reference line, according to claim 26, and an independently positionable marking unit having means for distance measurement, for characterizing a point of the reference path, the marking unit having a reflecting element.

34. A surveying system according to claim 33, wherein the device projecting a reference line and the marking unit have communication means for producing a particular mutual communication link.

35. A device projecting a reference line, according to claim 26, wherein the at least a part of the reference path being detectable as a reference line in its passage by the human eye and detectors.

36. A device projecting a reference line, according to claim 26, wherein the evaluation unit has a circuit which, on repeated passage through the reference path, accumulates parts of the measuring beam which are received for the at least one point and aggregates coordinated signals.

* * * * *